United States Patent [19]

Wojts-Saary et al.

[11] Patent Number: 5,429,097
[45] Date of Patent: Jul. 4, 1995

[54] DEVICE FOR FEEDING VAPORS OF A FUEL TANK INTO AN INTERNAL COMBUSTION ENGINE

[75] Inventors: Jürgen Wojts-Saary, Reinheim; Joachim Heinemann, Weinheim; Reinhard Tinz, Gross-Biberau; Stefan Knapp, Waldmichelbach, all of Germany

[73] Assignee: Firma Carl Freudenberg, Weinheim, Germany

[21] Appl. No.: 160,998

[22] Filed: Dec. 3, 1993

[30] Foreign Application Priority Data

Dec. 8, 1992 [DE] Germany ............. 42 41 274.9

[51] Int. Cl.⁶ ........................................... F02M 33/02
[52] U.S. Cl. ..................... 123/520; 123/198 D; 137/883
[58] Field of Search ............... 123/520, 516, 518, 519, 123/521; 137/883, 881, 512.1, 854

[56] References Cited

U.S. PATENT DOCUMENTS

| | | | |
|---|---|---|---|
| 4,702,216 | 10/1987 | Harata | 123/520 |
| 4,815,497 | 3/1989 | Pick | 137/883 |
| 4,815,705 | 3/1989 | Kasugai | 137/854 |
| 4,901,702 | 2/1990 | Beicht et al. | 123/520 |
| 5,040,564 | 9/1991 | Gaiardo | 137/883 |
| 5,191,870 | 3/1993 | Cook | 123/198 D |
| 5,193,512 | 3/1993 | Steinbenner | 123/519 |
| 5,220,897 | 6/1993 | Buchalla et al. | 123/520 |
| 5,245,975 | 9/1993 | Ito | 123/520 |

FOREIGN PATENT DOCUMENTS

| | | | |
|---|---|---|---|
| 4012111 | 3/1991 | Germany . | |
| 4308350 | 10/1992 | Japan | 123/519 |
| 5202812 | 8/1993 | Japan | 123/519 |
| 2252792 | 8/1992 | United Kingdom | 123/519 |

*Primary Examiner*—Carl S. Miller
*Attorney, Agent, or Firm*—Kenyon & Kenyon

[57] ABSTRACT

A device for feeding the vapors present in the free space of a fuel tank into the intake manifold of an internal combustion engine wherein the free space and the intake manifold are connected by a line in which an activated carbon container and a stop valve are connected in series, the activated carbon container being connected with the atmosphere by a vent line and the vent line can be closed by a vent line valve. The device further comprises an excess pressure valve and/or a vacuum valve which may be in the same housing as the vent line valve.

20 Claims, 2 Drawing Sheets

DEVICE FOR FEEDING VAPORS OF A FUEL TANK INTO AN INTERNAL COMBUSTION ENGINE

BACKGROUND OF THE INVENTION

The present invention relates to a device for feeding vapors present in the free space of a fuel tank into the intake manifold of an internal combustion engine. The free space and the intake manifold are connected by a line in which an activated carbon container and a stop valve are arranged in series. The activated carbon container is connected to the atmosphere by a vent line which can be closed off by a valve.

Such a device is known from DE-PS 40 12 111. Proceeding from a device according to DE-PS 38 02 664, corresponding to U.S. Pat. No. 4,901,702, the specification of which is incorporated herein by reference, there is arranged in addition, between the electromagnetically actuatable valve and the intake manifold, an auxiliary valve which can be sealed by a vacuum controller and which has a control chamber. In order to prevent the fuel-air mixture drawn in by the internal combustion engine from becoming excessively rich at low operating speeds of rotation of the internal combustion engine and/or upon a particularly high degree of saturation of the absorption element, the stop valve has the auxiliary valve connected in series directly in front of it. The auxiliary valve comprises a vacuum controller which consists of a rubber-elastic adjusting diaphragm and a compression spring, the auxiliary valve having a separate closure element which rests on one side against the adjusting diaphragm by means of a support collar and on the other side against the compression spring.

A leakage testing of the system shown in DE-PS 40 12 111 is effected by a valve which, during the testing, closes off the vent line which is open towards the atmosphere, the testing region being located during the test cycle between the stop valve which is also in a closed position and the tank installation of the internal combustion engine. The development of the valve, however, is not described.

The device shown in DE-PS 41 00 659, corresponding to U.S. Pat. No. 5,220,897, the specification of which is incorporated herein by reference, is provided with sensors in order to monitor its operability. The sensors transmit the actual measured values to a diagnostic unit, which compares the actual values with predetermined desired values. A testing of the device for leakages during operation is not incorporated in that system.

SUMMARY OF THE INVENTION

It is an object of the present invention to further develop a device of the type indicated above in such a manner that a monitoring of the device for leaks between the stop valve and the fuel tank can be effected with simple means and that upon malfunctioning the device will not be damaged either by increased pressure or decreased pressure present in the system.

Within the scope of the present invention, the vent line valve which controls the connection of the absorption element to the atmosphere is also provided with an excess pressure valve and/or a vacuum valve. The excess pressure valve and/or the vacuum valve are developed as safety valves, so as to reliably prevent any damaging of the device upon erroneous controlling of the vent line valve. A combining of the vent line valve, excess pressure valve and vacuum valve assures compact construction and favorable spatial association of the essential operating parts with respect to each other. In accordance with a less advantageous development, the safety valves could, to be sure, also be arranged separately within the device.

The vent line valve can be electrically connected in signal-conducting manner to an electronically regulated control unit which has a plurality of signal inputs and signal outputs and which can be formed, for instance, by the engine control. In the same manner as the vent line valve, the stop valve and a fuel tank venting valve as well as a pressure sensor may be connected in signal-conducting manner to the control unit. The controlling for leaks of the area between fuel tank and stop valve is effected by closing, for instance during the idling of the internal combustion engine, first the vent line valve and then the stop valve. In addition to a time-staggered closing of the two valves, the two valves may also be closed at the same time. The pressure previously present in the partial area of the system which is to be tested is measured over a predetermined period of time by a pressure sensor, the values being fed for evaluation to the control unit. If the pressure remains stable for the duration of the test then the system is free of leaks; otherwise, there is a leak.

If the change in pressure occurs in the direction of atmospheric pressure and reaches a value above a predetermined threshold value, this functional impairment can be displayed, for instance via the control unit, on a display unit.

The vent line valve, the excess pressure valve and the vacuum valve can be combined in one housing and can each have closure elements which are movable independently of each other and which have one continuous axis of movement. As a result of this development, all valves are protected by the housing from external influences. The continuous axis of movement results in a simple construction within the housing. Furthermore, the assembly of the entire device is facilitated since the vent line valve and the two safety valves can be preassembled in a common unit. Errors in assembly are reduced by this development which results in a reduced susceptibility to malfunctioning during the intended use of the device.

The closure element of the excess pressure valve can consist of an elastomeric material, can be developed as shuttle valve and can be integrally attached in one continuous piece to the closure element of the vacuum valve. The actuating of the excess pressure valve and the vacuum valve takes place merely via the differential pressure which is defined by the difference between the system pressure and the atmospheric pressure. The closure element of the vacuum valve can for instance be supported on the housing in its closed position with the interpositioning of an elastomeric seal and can close off an opening towards the atmosphere in air-tight manner. The closure element of the excess pressure valve can be arranged in this area so that there results a valve in the manner of a bilaterally acting safety valve.

The closure element of the vent line valve can be brought into a closed position by an electromagnet against the force of a compression spring. During normal operation the valve is in the open position for regeneration of the adjoining absorption element of activated carbon. The air drawn is drawn from the atmosphere through the activated carbon container and carries along a part of the volatile fuel components in the direction of the intake manifold of the internal combustion engine. During this operating condition, the excess pressure and vacuum valves within the housing are closed. If the tightness of the system is now to be tested, the electromagnet is placed under current with the result that the closure element of the valve is moved onto a sealing seat and closes off the passage to the internal combustion engine. The stop valve, which is arranged downstream of the activated carbon container in the direction of the intake manifold, is also closed during testing. Following the testing, the electromagnet is switched into a currentless state and the vent line valve is again brought into the open position by the compression spring. If the vent line valve remains in the closed position, for instance due to erroneous control, the vacuum valve will be lifted off from its sealing seat by differential pressure upon dropping below a minimum permissible pressure within the system, whereby the opening of the vacuum valve results in a pressure equalization with the atmosphere.

The excess pressure valve is for instance brought into the open position if the internal combustion engine is turned off in hot condition with the vent line valve closed and the gases present within the device expand as a result of the heat. If a maximum permissible pressure is exceeded within the device, the closure element of the excess pressure valve releases in an elastically yielding manner so that the excess pressure can escape.

The compression spring can be arranged on the side of the closure element of the vent line valve which faces away from the electromagnet. This development results in a reduction of the susceptibility to malfunction since only the magnet coils and the armature are arranged within the electromagnet. Malfunctions, which can for instance be caused by a tilted spring within the electromagnet, are thereby precluded. Furthermore, as a result of the arrangement of the compression spring outside the electromagnet there results a simplified assembly of the valves within the housing.

The first closure element of the vent line valve can be sealed off by a diaphragm between the closure element and the housing. In such a development, the diaphragm acts as a dirt barrier for the electromagnet which as a result thereof does not come into contact with the air flowing through the housing and the possible impurities. The electromagnet is arranged in separate manner within the housing due to this development and can be controlled via a plug. The diaphragm can for instance be developed as rolling diaphragm so that the adjusting of the magnetic force depends merely on the frictional force, on the spring force of the compression spring and on the pressure in the system.

A further simplification with respect to manufacturing can be achieved by a reduction of the components. The compression spring can be supported on the closure element of the vacuum valve. With this arrangement, the compression spring is utilized for moving the vent line valve back into its starting position once the electromagnet has been de-energized and the compression spring also determines the pressure at which the vacuum valve can be brought into the open position. By saving individual parts, advantages as to structural size result and the device can, from an economical standpoint, be produced in more cost efficient manner.

The closure element of the vacuum valve can be guided by a column-shaped projection which is integrally formed thereon and which engages into the compression spring. Guides which must be produced separately are not required in this case for guiding the closure element of the vacuum valve. Furthermore, no narrow tolerances need be maintained with such a development in order to maintain the spatial association of the closure element of the vacuum valve and its sealing seat. The sealing seat can, for instance, be formed by an elastomeric seal whereby a reliable sealing in this area is assured even if the closure element is not always in engagement with the seal in the same position.

The compression spring can be surrounded on the outside by a guide tube connected to the housing and can be guided by said guide tube. With a view towards a simple development of the housing, the guide tube can be developed as a sealing seat for the closure element of the vent line valve on the side facing the electromagnet. With a view towards a simple and cost efficient manufacture, the housing can consist of polymeric material.

One embodiment of the device according to the invention will be explained in greater detail below with reference to the accompanying drawings.

DETAILED DESCRIPTION OF THE DRAWINGS

Figure 1:
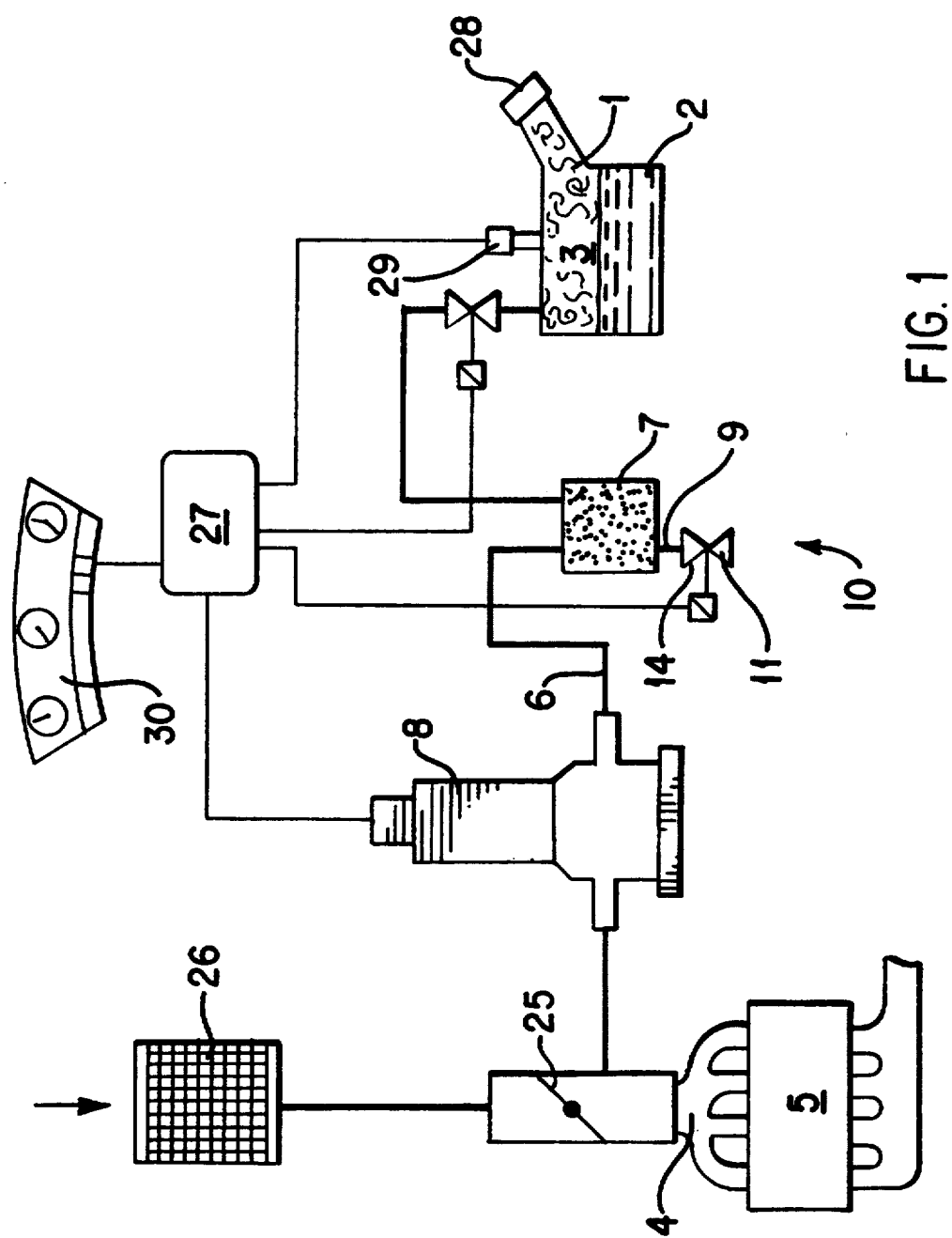
FIG. 1 is an overall view showing diagrammatically the individual parts being used in the system for feeding volatile fuel vapors into an internal combustion engine.

The device shown in FIG. 1 is intended for the feeding of vapors 3 present in the free space 1 of a fuel tank 2 into the intake manifold 4 of an internal combustion engine 5. A throttle valve 25, shown on a larger scale, is arranged within the intake manifold 4. The air from the atmosphere 10 is, before it is fed to the internal combustion engine 5, first of all freed of coarse impurities by the air filter 26. The free space 1 and the intake manifold 4 are connected by a line 6 in which an electromagnetically actuatable stop valve 8 and an activated carbon container 7 are arranged in series connection. The development of the stop valve 8 does not form part of the scope of the present invention and will therefore also not be described in greater detail here. One possible embodiment of such a stop valve is described in DE-PS 38 02 664, corresponding to U.S. Pat. No. 4,901,702. In general, the stop valve 8 should be developed in such a manner and be so controlled by a control unit 27 that the volatile fuel components 3 are fed to the internal combustion engine during its intended use to exactly the right extent so that good properties result in use. At low operating speeds of rotation and/or at a particularly high degree of saturation of the absorption element in the activated carbon container 7, only such an amount of volatile fuel components is fed to the internal combustion engine 5 that the fuel-air mixture drawn in does not become excessively rich. On the other hand, at high operating speeds of rotation of the internal combustion engine 5, with the throttle valve 25 opened wide and a consequently reduced differential pressure, there must be the greatest possible overall passage through the stop valve 8 in order to effect a good regenerating of the absorption element in the activated carbon container 7. The fuel tank 2 is hermetically closed by a tank cover 28.

In order to be able to evaluate the functioning of the device, it is necessary to test frequently the area between the fuel tank 2 and the stop valve 8 during use for leakages in order to prevent volatile fuel components from escaping into the atmosphere without combustion. For this purpose a vent line valve 11 can be arranged in front of the activated carbon container 7 and the vent line 9 which connects the activated carbon container 7 to the atmosphere 10, so that the vent line 9 can be closed by the vent line valve 11. The vent line valve 11 is electrically connected in signal-conducting manner to the control unit 27 in a similar manner as the pressure sensor 29. Any change in pressure during the test cycle is displayed on the display instrument 30 when a permissible threshold value is exceeded. For the testing of the device as to leaks, the vent line valve 11 is closed first and then the stop valve 8, preferably during idling of the internal combustion engine. The valves receive the signals for opening or closing via the control unit 27 which can be developed as engine management for the actuating, for instance, of the ignition and of the injection unit of the internal combustion engine 5. Once both valves 8, 11 have been closed, the pressure between the stop valve 8 and the fuel tank 2 is determined by the pressure sensor 29 over a predetermined period of time. If the pressure remains stable, this means that the device has no leak in the area tested. If, with increasing time, the pressure approaches atmospheric pressure to a point above a permissible threshold value, then this leakage is indicated via the control unit 27 on the display instrument 30.

Figure 2:
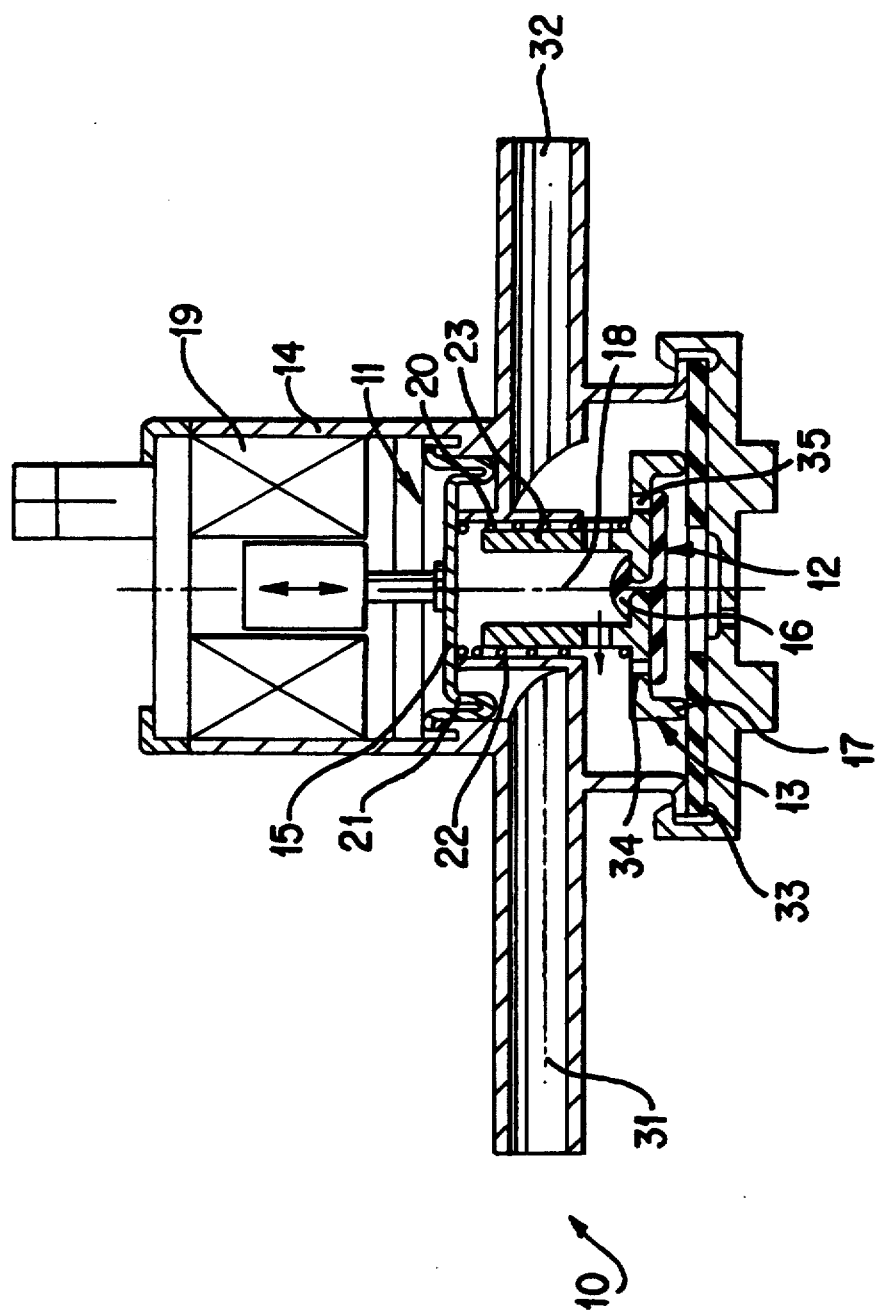
FIG. 2 shows the electromagnetically actuatable vent line valve, the excess pressure valve and the vacuum valve in a common housing.

In FIG. 2, the vent line valve 11, excess pressure valve 12 and vacuum valve 13 are arranged in a common housing 14. The excess pressure valve 12 and the vacuum valve 13 are developed as safety valves, and they prevent a damaging of the device if inside pressures occur which go beyond the permissible pressures. The control elements 15, 16, 17 of vent line valve 11, excess pressure valve 12 and vacuum valve 13 can be moved independently of each other and have in this embodiment an identical axis of movement 18. The vent line valve 11 is provided with an electromagnet 19 which, when acted on by current, moves the closure element 15 into the closed position on the valve seat 22 of the guide tube 24.

The housing 14 consists in this embodiment of a polymeric material and is made of two parts. The first part of the housing 14 is formed by the feed line 31 and the discharge line 32, the discharge line 32 being connected to the activated carbon container 7 by the vent inlet 9. Furthermore, the first housing part contains the vent line valve 11 and the electromagnet 19, it being of great importance that the closure element 15 of the vent line valve 11 is sealed off from the housing 14 by a diaphragm 21. This results in high reliability in operation since the diaphragm 21 serves as dirt barrier and as seal for the electromagnet 19. The second part of the housing is formed by a cover which can be snapped on, with the interposing of an elastomeric seal 33, on the side of the housing 14 facing away from the electromagnet 19. The housing cover and the elastomeric seal 33 are provided with an opening in order, if required, to connect the inside of the housing 14 to the atmosphere. The closure element 16 of the excess pressure valve 12 is clipped into the closure element 17 of the vacuum valve 13. The closure element 17 of the vacuum valve 13 is plate-shaped and surrounds in sealing manner the openings of sealing element 33 and housing. The closure element 17 is provided in this embodiment with two openings in order to make the action of pressure on the closure element 16 possible.

The housing 14 is provided with a guide tube 24 in which a compression spring 20 and the closure element 17 of the vacuum valve 13 are guided in the region of a column-shaped projection 23. The compression spring 20 effects on the one hand the return of the closure element 15 of the vent line valve 11 upon the deenergizing of the electromagnet 19 and on the other hand a pressing of the closure element 17 of the vacuum valve 13 against the elastomeric seal 33. The closure element 16 of the excess pressure valve 12 rests with initial elastic tension against the inner surface of the plate-shaped recess of the vacuum valve 13.

The vacuum valve 13 operates in the following manner. An impermissibly high vacuum can, for instance, result within the device if the vent line valve 11 is held in its closed position due to a malfunctioning. In this event, the closure element 17 of the vacuum valve 13 moves, upon falling below the minimum permissible pressure, into the open position providing a connection between the atmosphere 10 and the device in the region of its sealing seat. The opening characteristic of the vacuum valve 13 can be influenced by the compression spring 20. A damaging/destruction of the valve can thus be prevented.

The excess pressure valve 12 is also developed as safety valve and is moved into the open position for instance when the vent line valve 11 is in its closed position with the hot internal combustion engine 5 being shut off. The volatile fuel components which are present within the device expand as a result of the heat until a maximum permissible pressure within the device is exceeded. By the action of pressure on the closure element 16 through the openings 34, 35 in the closure element 17, the excess pressure valve 12, which can be developed as mushroom-type diaphragm, moves elastically into the open position, and the excess pressure is thereby reduced.

During the proper operation of the internal combustion engine and the device, the two safety valves are in their closed position and the electromagnetically actuatable vent line valve 11 is lifted off from the valve seat 22 so that the absorption element within the activated carbon container 7 can be regenerated.

What is claimed is:

1. A device for feeding vapors present in a free space of a fuel tank into an intake manifold of an internal combustion engine wherein the free space and the intake manifold are connected by a line in which an activated carbon container and a stop valve are arranged in series, the activated carbon container being connected with the atmosphere by a vent line, and further comprising:
   a vent line valve for selectively opening and closing the vent line which connects the activated carbon container to the atmosphere;
   an excess pressure valve for providing an opening to the atmosphere upon exceeding a maximum pressure; and
   a vacuum valve for providing an opening to the atmosphere upon falling below a minimum pressure;
   wherein the vent line valve, the excess pressure valve and the vacuum valve are combined in a housing.

2. A device according to claim 1 wherein the vent line valve, the excess pressure valve and the vacuum valve have closure elements which are moveable independently of each other and which have one continuous axis of movement.

3. A device according to claim 2 wherein the closure element of the excess pressure valve comprises elastomeric material, is developed as a shuttle valve, and is attached as one continuous piece to the closure element of the vacuum valve.

4. A device according to claim 2 wherein the closure element of the vent line valve can be brought into a closed position by an electromagnet against the force of a compression spring.

5. A device according to claim 4 wherein the compression spring is arranged on a side of the closure element of the vent line valve facing away from the electromagnet.

6. A device according to claim 4 wherein the closure element of the vent line valve is sealed off from the housing by a diaphragm.

7. A device according to claim 4 wherein the compression spring is supported on the closure element of the vacuum valve.

8. A device according to claim 7 wherein the closure element of the vacuum valve is guided by a column-shaped projection formed integrally with the closure element of the vacuum valve and engaging into the compression spring.

9. A device according to claim 4 wherein the compression spring is surrounded on the outside by a guide tube connected to the housing and wherein the compression spring is guided by the guide tube.

10. A device according to claim 1 wherein the excess pressure valve and the vacuum valve are located along the line between the stop valve and the fuel tank.

11. A device according to claim 10 wherein the excess pressure valve and the vacuum valve are located along the vent line between the vent line valve and the activated carbon container.

12. A device for feeding vapors present in a free space of a fuel tank into an intake manifold of an internal combustion engine wherein the free space and the intake manifold are connected by a line in which an activated carbon container and a stop valve are arranged in series, the activated carbon container being connected with the atmosphere by a vent line, and further comprising:

a vent line valve for selectively opening and closing the vent line which connects the activated carbon container to the atmosphere; and an excess pressure valve for providing an opening to the atmosphere upon exceeding a maximum pressure;

wherein the vent line valve and the excess pressure valve are combined in a housing.

13. A device according to claim 12 wherein the vent line valve and the excess pressure valve have closure elements which are moveable independently of each other and which have one continuous axis of movement.

14. A device according to claim 13 wherein the closure element of the excess pressure valve comprises elastomeric material and is developed as a shuttle valve.

15. A device according to claim 13 wherein the closure element of the vent line valve can be brought into a closed position by an electromagnet against the force of a compression spring.

16. A device according to claim 15 wherein the closure element of the vent line valve is sealed off from the housing by a diaphragm.

17. A device for feeding vapors present in a free space of a fuel tank into an intake manifold of an internal combustion engine wherein the free space and the intake manifold are connected by a line in which an activated carbon container and a stop valve are arranged in series, the activated carbon container being connected with the atmosphere by a vent line, and further comprising:

a vent line valve for selectively opening and closing the vent line which connects the activated carbon container to the atmosphere; and a vacuum valve for providing an opening to the atmosphere upon falling below a minimum pressure;

wherein the vent line valve and the vacuum valve are combined in a housing.

18. A device according to claim 17 wherein the vent line valve and the vacuum valve have closure elements which are moveable independently of each other and which have one continuous axis of movement.

19. A device according to claim 18 wherein the closure element of the vent line valve can be brought into a closed position by an electromagnet against the force of a compression spring.

20. A device according to claim 19 wherein the closure element of the vent line valve is sealed off from the housing by a diaphragm.

* * * * *